US011799099B2

(12) United States Patent
Matsuzaki et al.

(10) Patent No.: US 11,799,099 B2
(45) Date of Patent: Oct. 24, 2023

(54) AIR BEARING COOLING PATH FOR COMPRESSOR DEVICE

(71) Applicant: Garrett Transportation I Inc, Torrance, CA (US)

(72) Inventors: Ryoken Matsuzaki, Torrance, CA (US); Junichi Masuda, Torrance, CA (US); Marika Alexakis, Redondo, CA (US)

(73) Assignee: GARRETT TRANSPORTATION I INC., Torrance, CA (US)

(*) Notice: Subject to any disclaimer, the term of this patent is extended or adjusted under 35 U.S.C. 154(b) by 31 days.

(21) Appl. No.: 17/331,814

(22) Filed: May 27, 2021

(65) Prior Publication Data

US 2021/0376340 A1    Dec. 2, 2021

Related U.S. Application Data

(63) Continuation-in-part of application No. 16/889,967, filed on Jun. 2, 2020.

(51) Int. Cl.
*H01M 8/04111* (2016.01)
*F01D 25/16* (2006.01)
*F01D 25/24* (2006.01)

(52) U.S. Cl.
CPC ......... *H01M 8/04111* (2013.01); *F01D 25/16* (2013.01); *F01D 25/24* (2013.01); *F05D 2230/60* (2013.01); *F05D 2240/50* (2013.01); *H01M 2250/20* (2013.01); *H01M 2250/407* (2013.01)

(58) Field of Classification Search
CPC ......... H01M 8/04111; H01M 2250/407; F01D 25/125; F05D 2240/50; F05D 2240/53; F05D 2240/54; F16C 32/0607; F16C 37/002
See application file for complete search history.

(56) References Cited

U.S. PATENT DOCUMENTS

| 4,896,975 | A  |   | 1/1990 | Bescoby et al. |
| 7,056,103 | B2 | * | 6/2006 | LaRue ................. F01D 25/125 417/174 |

(Continued)

FOREIGN PATENT DOCUMENTS

| EP | 2600007 B1 | 5/2019 | |
| WO | 2019087869 A1 | 5/2019 | |
| WO | WO-2019087869 A1 * | 5/2019 | ........... F01D 17/141 |

*Primary Examiner* — Courtney D Heinle
*Assistant Examiner* — Danielle M. Christensen
(74) *Attorney, Agent, or Firm* — LORENZ & KOPF, LLP

(57) ABSTRACT

A turbomachine includes a rotating group with a turbine wheel. The turbomachine also includes a housing that houses the rotating group, wherein the housing defines a turbine outlet passage for exhaust from the turbine wheel. The turbine outlet passage is directed in a downstream direction along an axis of the turbine outlet passage. The turbomachine includes an air bearing system with at least one bearing component that supports the rotating group for rotation relative to the housing. The air bearing system includes a bearing cooling path that is fluidly connected to the at least one bearing component and that has a bearing air line outlet. The bearing air line outlet is fluidly connected to the turbine outlet passage and is directed in the downstream direction along the axis.

20 Claims, 4 Drawing Sheets

(56) References Cited

U.S. PATENT DOCUMENTS

| | | | |
|---|---|---|---|
| 8,567,190 B2 * | 10/2013 | Sumser | ............... F04D 29/4233 |
| | | | 415/206 |
| 11,339,800 B2 * | 5/2022 | Sakota | .................. F01D 17/141 |
| 2020/0256343 A1 | 8/2020 | Sakota et al. | |

* cited by examiner

AIR BEARING COOLING PATH FOR COMPRESSOR DEVICE

CROSS REFERENCE TO RELATED APPLICATION

The following is a continuation-in-part of U.S. patent application Ser. No. 16/889,967, filed Jun. 2, 2020, the entire disclosure of which is incorporated by reference.

TECHNICAL FIELD

The present disclosure generally relates to a turbine section of a turbomachine and, more particularly, to a compressor device with an air bearing cooling path that outlets to a turbine section exhaust flow path.

BACKGROUND

Fuel cell systems and other machinery often include a turbomachine charging device. In the case of a fuel system, for example, a fuel cell compressor device may be included for compressing air before it is fed to the fuel cell stack. This can increase operating efficiency of the fuel cell system.

However, conventional turbomachines, such as fuel cell compressor devices, suffer from various deficiencies. For example, it may be difficult to incorporate an air bearing system (i.e., plain bearing system, journal bearing system, etc.) within a fuel cell compressor device or other turbomachine. In particular, the fluid cooling system providing a cooling airstream to the air bearing components can be difficult to incorporate without negatively affecting performance, manufacturing efficiency, etc.

Moreover, some fuel cell compressor devices include a turbine section that ingests liquid water exhausted from the fuel cell stack. The liquid water can inhibit operation of the turbine section, the bearing system, etc. This condition can cause rotational surging of the rotating group, overload the bearing, and/or otherwise negatively affect the compressor device.

It is therefore desirable to provide a turbomachine, such as a fuel cell compressor device, with an improved air bearing system. It is desirable to provide a turbomachine with an improved air bearing cooling system. It is also desirable to provide a fuel cell compressor device with increased water ingestion capability. Other desirable features and characteristics of the present disclosure will become apparent from the subsequent detailed description and the appended claims, taken in conjunction with the accompanying drawings and this background discussion.

BRIEF SUMMARY

In one embodiment, a turbomachine is disclosed that includes a rotating group with a turbine wheel and a housing that houses the rotating group. The housing defines a turbine outlet passage for exhaust from the turbine wheel. The turbine outlet passage is directed in a downstream direction along an axis of the turbine outlet passage. The turbomachine also includes an air bearing system with at least one bearing component that supports the rotating group for rotation relative to the housing. The air bearing system includes a bearing cooling path that is fluidly connected to the bearing component and that has a bearing air line outlet. The bearing air line outlet is fluidly connected to the turbine outlet passage and is directed in the downstream direction along the axis.

In another embodiment, a method of manufacturing a turbomachine is disclosed. The method includes supporting a rotating group of the turbomachine within a housing with an air bearing system. The rotating group includes a turbine wheel. The housing defines a turbine outlet passage for exhaust from the turbine wheel. The turbine outlet passage is directed in a downstream direction along an axis of the turbine outlet passage. The method also includes fluidly connecting an air line outlet of a bearing cooling path of the air bearing system to the turbine outlet passage. The turbine outlet passage is directed in the downstream direction along the axis.

In an additional embodiment, a fuel cell system is disclosed that includes a fuel cell fuel cell stack and an electrically motorized turbocharger. The turbocharger includes a rotating group with a turbine wheel configured to be driven in rotation by high-pressure exhaust from the fuel cell stack. The turbocharger also includes a housing that houses the rotating group. The housing defines a turbine outlet passage for low-pressure exhaust from the turbine wheel. The turbine outlet passage is directed in a downstream direction along an axis of the turbine outlet passage. The turbocharger further includes an air bearing system with at least one bearing component that supports the rotating group for rotation relative to the housing. The air bearing system includes a bearing cooling path that is fluidly connected to the bearing component and has a bearing air line outlet. The bearing air line outlet is fluidly connected to the turbine outlet passage and is directed in the downstream direction along the axis.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
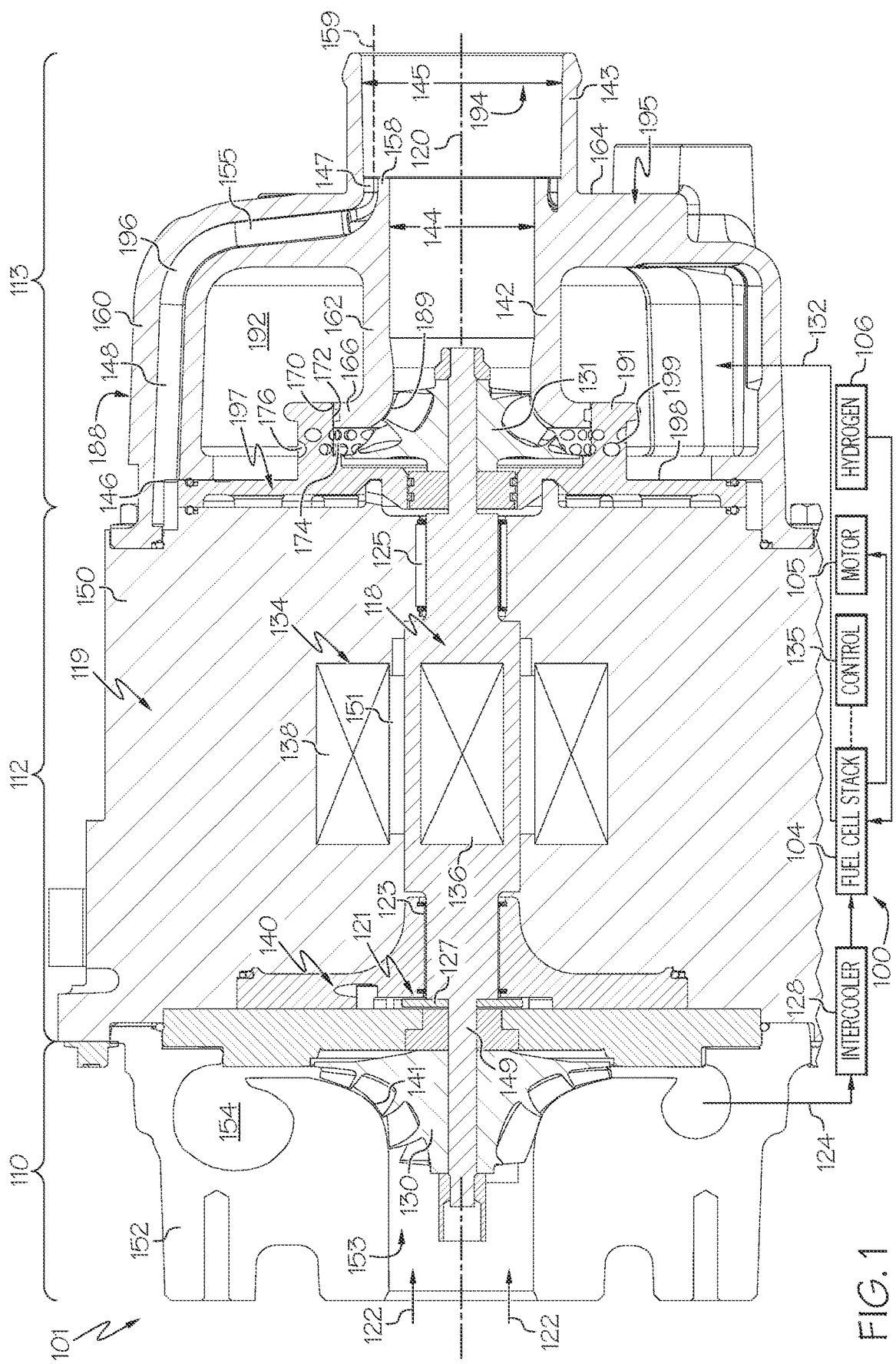
FIG. 1 is a schematic diagram of a fuel cell system with a cross-sectional view of a turbomachine according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbomachine, such as a turbocompressor device. In some embodiments, the turbomachine may be a fuel cell compressor device with a turbine section that receives exhaust from a fuel cell stack for driving a turbine wheel. The turbine section may also include a turbine outlet passage for directing flow of exhaust from the turbine wheel. Moreover, the turbomachine may include an air bearing system with an air bearing cooling path that provides a flow of air to one or more bearing components for cooling purposes and for supporting rotation of the rotating group of the turbomachine within the housing. The air bearing cooling path may include an air line outlet that is fluidly connected to the turbine outlet passage. The air line outlet may be directed in the downstream direction along the axis. Accordingly, the air bearing system may be effectively cooled and robustly supported by the air flowing through the bearing cooling path. Also, this air may be output directly to the turbine outlet passage without negatively affecting aerodynamic performance of the turbine section. Furthermore, in some embodiments, the turbomachine may operate in conditions in which a high pressure exhaust stream to the turbine section contains moisture, liquid water droplets, slugs of water, etc. The axially-directed outlet of the bearing air line outlet may provide protection from water intrusion in an upstream direction into the bearing cooling path.

Additional example embodiments of the present disclosure include a turbine section (i.e., turbine stage) of a turbomachine that provides certain operational benefits thereto. In some embodiments, the housing at the turbine section defines a circumferential flow passage (e.g., a toroidal passage, a volute passage, etc.) and an outlet. The turbine section may also include a turbine wheel that is disposed between the circumferential flow passage and the outlet along a first flow path for at least one fluid. The housing may also define a recirculation flow path that allows recirculation of at least one fluid. The recirculation flow path may include a recirculation flow channel that fluidly connects a turbine wheel upstream area of the first flow path back to the circumferential inlet passage. Accordingly, a fluid (e.g., liquid water) within the turbine wheel upstream area may recirculate back into the circumferential inlet passage instead of continuing along the first flow path and across the turbine wheel. Thus, rotation of the turbine wheel is less likely to be affected by this fluid. When used in a fuel cell system, for example, the turbine section/stage of the present disclosure has improved water ingestion capability.

Furthermore, the housing may define the bearing air line outlet, the circumferential flow passage, the turbine outlet passage, and a surface that opposes blades of the turbine wheel. The bearing air line outlet may extend through the housing and across the turbine section. Also, the bearing air line outlet may extend over (i.e., may be disposed radially outward from) the circumferential flow passage to fluidly connect the bearing components of the air bearing system to the turbine outlet passage. Also, the housing may include an inner radial lip that separates the air line outlet from the turbine outlet. The inner radial lip may direct the air line outlet in the axial and downstream direction along the turbine outlet. The inner radial lip may also act as a barrier to block moisture, liquid water, droplets, etc. from intruding in the upstream direction into the air bearing cooling path.

Referring initially to FIG. 1, a turbomachine 101 is shown according to example embodiments. As shown, the turbomachine 101 generally includes a housing 119 (shown schematically) and a rotating group 118 supported for rotation within the housing 119 about an axis of rotation 120 by one or more bearings 121. In some embodiments, the rotating group 118 and the housing 119 may cooperatively define a compressor section 110 (i.e., compressor stage) and a turbine section 113 (i.e., turbine stage). Also, a motor section 112 may be disposed axially between the compressor and turbine sections 110, 113.

The rotating group 118 may generally include a shaft 149 that extends axially through the compressor section 110, the turbine section 113, and the motor section 112. The rotating group 118 may also include a compressor wheel 130 and a turbine wheel 131, which are attached on opposite ends of the shaft 149.

The bearing 121 of the turbomachine 101 supports the rotating group 118 for rotation within the housing 119. The bearing 121 may have various configurations without departing from the scope of the present disclosure. In the illustrated embodiment, the bearing 121 is an air bearing (i.e., air bearing system). However, it will be appreciated that the bearing 121 may include roller elements or may be configured otherwise. The bearing may 121 also include an oil-fed journal bearing of various architectures (e.g., fully floating, semi-floating, split, coupled, etc.). Moreover, the bearing 121 may include an oil-fed rolling element bearing in some embodiments.

As shown in FIG. 1, the bearing 121 may be an air bearing system (plain bearing, journal bearing, etc.) having a first journal member 123, a second journal member 125, and a thrust bearing member 127. The first and second journal members 123, 125 may be spaced apart axially on opposite sides of the motor 134. The thrust bearing member 127 may be disposed axially between the compressor wheel 130 and the first journal member 123.

The bearing 121 (the air bearing system) may also include at least one bearing cooling path 140. At least part of the cooling path 140 may extend through the housing 119, routing air to one or more components of the bearing 121 for cooling purposes and for supporting rotation of the rotating group 118 as will be discussed. More specifically, air may be delivered via the cooling path 140 to the thrust bearing member 127 to provide a cooling film of air on both axial faces to thereby support thrust loads during operation. Moreover, air may be delivered via the cooling path 140 to the first journal member 123 and/or the second journal member 125 to provide a cooling film of air in a radial space therein to thereby support radial loads during operation.

The turbomachine 101 may be operatively connected to a fuel cell system 100 and may be configured as an e-charger or electric motorized compressor device for the fuel cell system 100. The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. In some embodiments, the fuel cell system 100 may be included in a vehicle, such as a car, truck, sport utility vehicle, van, motorcycle, etc. Therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the turbomachine 101. More specifically, the motor section 112 may drive rotation of the rotating group 118, the compressor section 110 may provide a compressed air stream (represented by arrow 124) to an intercooler 128 as it flows to the stack 104, and an exhaust gas stream 132 from the stack 104 may be fed back to the turbine section 113, which in turn provides mechanical power assist to the motor section 112.

Various components of the fuel cell system 100 and/or the turbomachine 101 may be controlled by a control system 135. The control system 135 may be a computerized system with a processor, various sensors, and other components for electrically controlling these operations. In some embodiments, the control system 135 may define or may be part of the electrical control unit (ECU) of a vehicle.

It will be appreciated, however, that other configurations of the turbomachine 101 fall within the scope of the present disclosure. For example, the turbomachine 101 of the present disclosure may be provided in other systems (i.e., other than fuel cell systems). Moreover, features of the turbine section 113 may be included in a turbocharger or other turbomachine without departing from the scope of the present disclosure.

Figure 2:
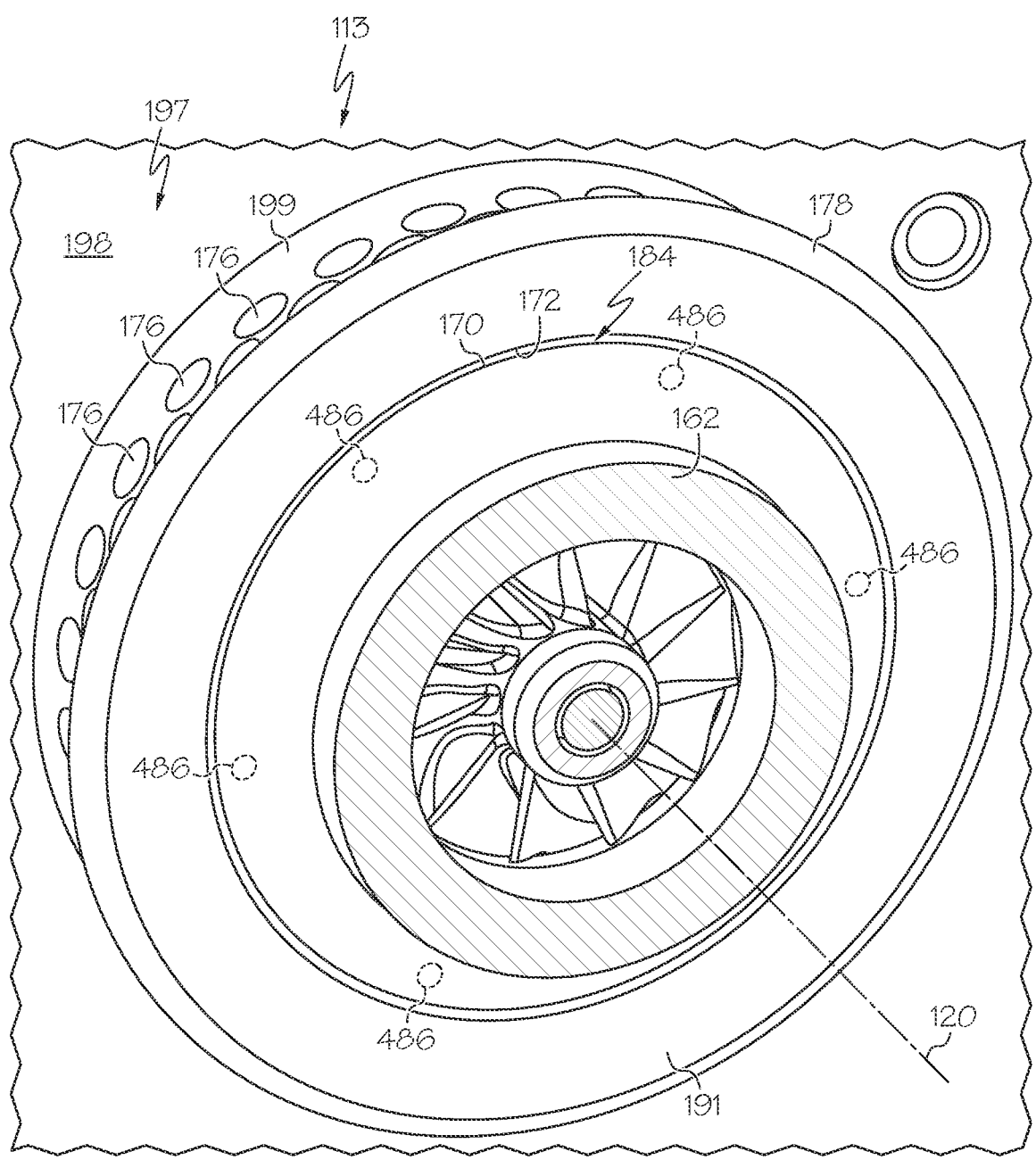
FIG. 2 is an isometric view of part of a turbine section of the turbomachine of FIG. 1.
Figure 3:
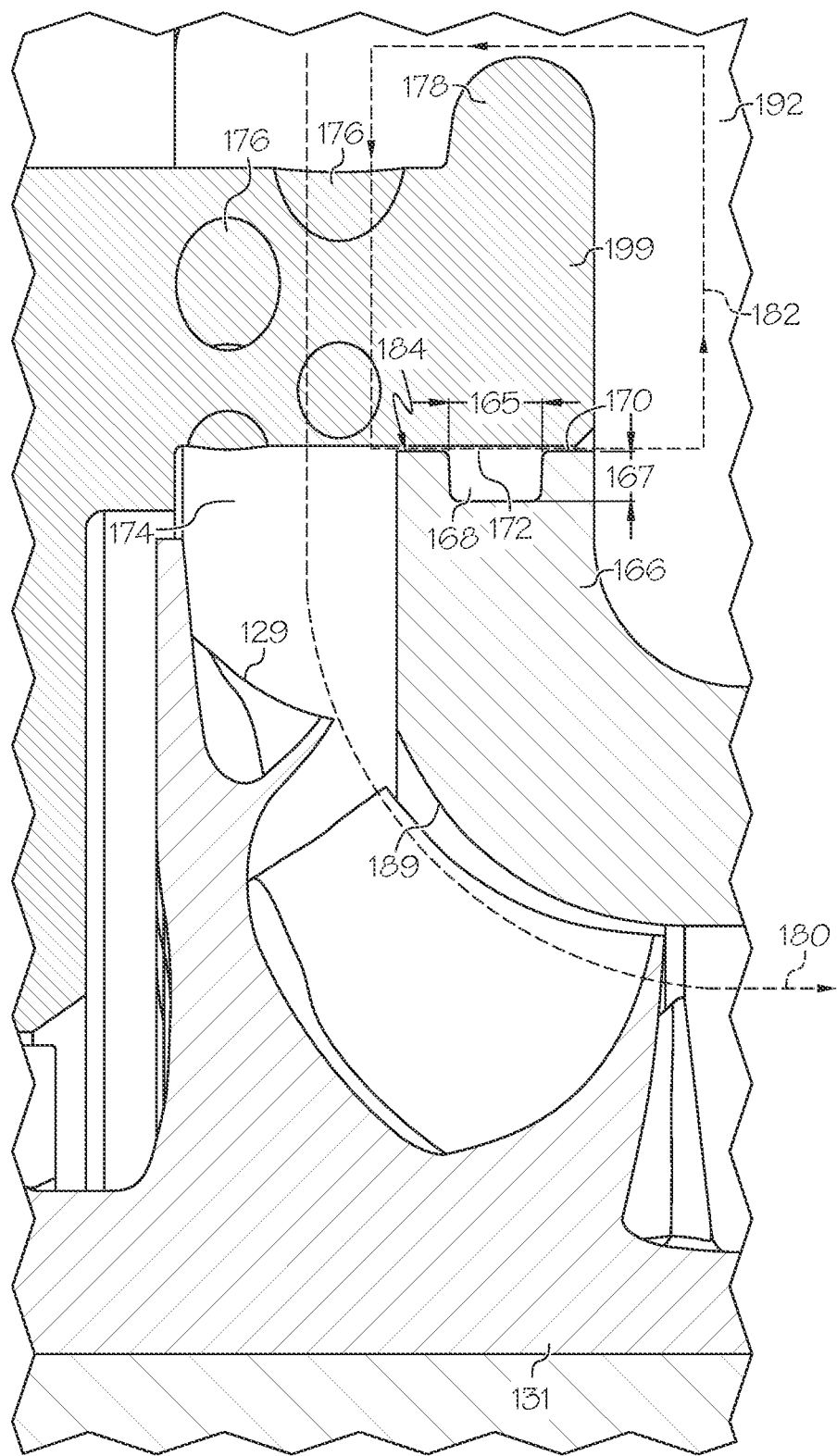
FIG. 3 is a cross-sectional view of the turbine section of FIG. 2 according to example embodiments.

Referring now to FIGS. 1-3, the housing 119 of the turbomachine 101 will be discussed in greater detail according to example embodiments. As schematically illustrated in FIG. 1, the housing 119 of the turbomachine 101 may include a compressor housing 152, a motor housing 150, and a turbine housing 188. The compressor housing 152 may define part of the compressor section 110, the motor housing 150 may define part of the motor section 112, and the turbine housing 188 may define part of the turbine section 113. These parts of the housing 119 may be assembled together as detailed below to collectively house and support the rotating group 118.

The compressor housing 152 may be a unitary, one-piece, arcuate part that is made of metal in some embodiments. The compressor housing 152 may define an inlet 153 extending along and centered on the axis 120. The compressor housing 152 may also include a convex compressor shroud surface 141 that is positioned in a downstream direction from the inlet 153. The compressor housing 152 also may include a volute passage 154 that extends about the axis 120. The compressor housing 152 may be fixed to one axial face of the motor housing 150 so as to cover over a front face of the compressor wheel 130 of the rotating group 118. The shroud surface 141 may oppose the compressor wheel 130 and may have inverse contour relative thereto. The inlet 153 may be fluidly connected to an exterior space (i.e., ambient) or may be fluidly connected to an upstream compressor device for receiving an airflow. The volute passage 154 may be fluidly connected to the intercooler 128 for providing the compressed airflow 124 thereto.

The motor housing 150 may include one or more parts that define a cavity 151 for receiving and housing one or more parts of a motor 134 (e.g., an electric motor). In some embodiments, the motor housing 150 may house and support a motor stator member 138 within the cavity 151, whereas a motor rotor member 136 may be supported on the shaft 149 of the rotating group 118. As shown, the stator member 138 may surround the motor rotor member 136 circumferentially about the axis 120; however, in other embodiments, the rotor member 136 may surround the stator member 138.

The turbine housing 188 may include an outer turbine housing 195. The outer turbine housing 195 may be a unitary, one-piece arcuate part that is hollow and that is made of metal in some embodiments. The outer turbine housing 195 may include an outer radial portion 160 and an inner radial portion 162. The outer radial portion 160 and the inner radial portion 162 may include walls or other barrier structures that project axially from an axial end portion 164 of the outer turbine housing 195. The outer and inner radial portions 160, 162 may be spaced apart in the radial direction.

The inner radial portion 162 may be arcuate (e.g., annular), tubular, and hollow. The inner radial portion 162 may include an arcuate axial end 166. The end 166 may be contoured outward radially and may define a convex turbine shroud surface 189 thereon. The turbine shroud surface 189 may cover over and oppose outer edges of the blades of the turbine wheel 131. The inner radial portion 162 may also define an outlet passage 194 that extends along and that is centered on the axis 120. The outlet passage 194 may be cooperatively defined by a plurality of pipe segments that are arranged in-series along the axis 120 and that have different widths (e.g., different diameters, radii, etc.) The outlet passage 194 may be defined by a first turbine exhaust pipe segment 142 that projects axially in one direction from the axial end portion 164. The outlet passage 194 may be further defined by a second turbine exhaust pipe segment 143 that projects axially in the opposite direction from the axial end portion 164. The first turbine exhaust pipe segment 142 may have a first inner diameter 144, and the second may have a second inner diameter 145. The second inner diameter 145 may be larger than the first inner diameter 144. The first and second turbine exhaust pipe segments 142, 143 may be axially straight and may be centered on the axis 120 and arranged in-series axially with the second turbine exhaust pipe segment 143 disposed downstream of the first turbine exhaust pipe segment 142. Thus, the exhaust stream 132 may flow past the turbine wheel 131, through the first turbine exhaust pipe segment 142, and then through the second turbine exhaust pipe segment 143 to exit the turbine section 113.

As shown in FIG. 1, the outer turbine housing 195 may further include at least one bearing air line outlet 196. The bearing air line outlet 196 may be a fluid passage of the bearing cooling path 140. The bearing air line outlet 196 may extend through the outer turbine housing 195 to fluidly connect one or more components of the bearing 121 to the outlet passage 194. Thus, air may be provided to the thrust bearing member 127, the first journal member 123, and/or the second journal member 125 via the bearing cooling path 140, and this air may flow further downstream through the bearing air line outlet 196 of the outer turbine housing 195.

The bearing air line outlet 196 may be an elongate passage, fluid conduit, tube, etc. with an upstream end 146 and a downstream end 147. The bearing air line outlet 196 may be nonlinear and curved as it extends from the upstream end 146 to the downstream end 147.

The upstream end 146 may be disposed at or proximate the motor housing 150. The upstream end 146 may be fluidly connected via the bearing cooling path 140 to the thrust bearing member 127, the first journal bearing member 123, and/or the second journal bearing member 125 to receive airflow therefrom.

The bearing air line outlet 196 may also include an axial segment 148 that extends axially (i.e., along the axis 120 but spaced radially therefrom) in a downstream direction from the upstream end 146. The outlet 196 may further include a radially-extending section 155 that extends radially inward toward the axis 120 in a downstream direction from the axial segment 148.

Moreover, the bearing air line outlet 196 may include a downstream terminal end 147. The downstream terminal end 147 may curve axially from the radially-extending section 155 and may be disposed at and fluidly connected to the turbine outlet passage 194. The downstream terminal end 147 may be directed in the downstream direction along the axis 120. The downstream terminal end 147 may define an outlet axis 159, which is indicated in FIG. 1 to show that the downstream terminal end 147 is directed axially in the downstream direction along the axis 120 from the turbine wheel 131. The downstream terminal end 147 may be at least partly defined by a downstream-directed lip 158. The lip 158 may be an annular extension of the first turbine exhaust pipe segment 142. Thus, the lip 158 may be disposed at a transition between the first and second turbine exhaust pipe segments 142, 143. The lip 158 may radially separate the bearing air line outlet 196 from the turbine outlet passage 194.

The outer radial portion 160 of the outer turbine housing 195 may be fixed to the axial face of the motor housing 150, on an axial side that is opposite the compressor housing 152. As such, the outer turbine housing 195 may cover over a front face of the turbine wheel 131 of the rotating group 118. The turbine shroud surface 189 may oppose the turbine wheel 131 and may have inverse contour relative thereto.

The turbine housing 188 may further include an inner turbine housing structure 197. The inner turbine housing structure 197 may be a unitary member made out of metal. The inner turbine housing structure 197 may include a back plate 198 and a nozzle structure 199. The back plate 198 may be relatively flat and may extend substantially perpendicular to the axis 120 to cover over a back face of the turbine wheel 131. The nozzle structure 199 may be arcuate so as to extend at least partly about the axis 120. In some embodiments, the nozzle structure 199 may be annular and ring-shaped (FIG. 2). The nozzle structure 199 may also be fixed to the back plate 198 and may project axially away therefrom and may terminate at an axial end 191. The nozzle structure 199 may include a plurality of nozzle apertures 176 that extend therethrough generally in the radial direction. In some embodiments, the nozzle apertures 176 may each be a rounded through-hole with an axis directed radially and substantially toward the turbine wheel 131. Also, as shown in FIG. 2, the nozzle apertures 176 may be disposed in an evenly spaced-apart arrangement about the axis 120. Furthermore, as shown in FIGS. 2 and 3, the axial end 191 of the nozzle structure 199 may include a dam 178. The dam 178 may be a rounded flange that projects radially outward and that extends continuously about the axis 120 in the circumferential direction.

The inner turbine housing structure 197 may be attached to the outer turbine housing 195 and the motor housing 150 as shown in FIGS. 1 and 3. The outer radial portion of the back plate 198 may be disposed axially between the outer turbine housing 195 and the motor housing 150. The shaft 149 may extend through the central portion of the back plate 198, and the nozzle structure 199 may encircle the turbine wheel 131. Also, the axial end 191 of the nozzle structure 199 may mate with the arcuate end 166 of the outer turbine housing 195. Those having ordinary skill in the art will appreciate that the term "mate" in this context is to be interpreted broadly. Opposing surfaces of the ends 191, 166 may be shaped in a corresponding manner and disposed closely adjacent to define a mating interface. These surfaces may or may not be physically connected to be considered mated together. In some embodiments, a sealing member may be included between these opposing surfaces, but such a sealing member may be omitted in some embodiments discussed in detail below. In some embodiments, the ends 191, 166 may establish a male-female interface wherein the arcuate end 166 is received within the axial end 191 of the nozzle structure 199. In some embodiments, an outer radial surface 170 of the arcuate end 166 may radially oppose an inner radial surface 172 of the axial end 191 of the nozzle structure 199. This interface will be discussed in greater detail below according to various embodiments of the present disclosure.

When assembled together, the outer turbine housing 195 and the inner turbine housing structure 197 may cooperatively define at least part of a circumferential inlet passage 192, which extends about the axis 120. The inlet passage 192 may be defined radially between the outer radial portion 160 and the inner radial portion 162 of the outer turbine housing 195 and between the outer radial portion 160 and the nozzle structure 199. The inlet passage 192 may defined axially between the back plate 198 and the axial end portion 164. As represented in FIG. 1, the passage 192 may be a toroidal passage with a cross sectional area that remains substantially constant as the passage 192 extends about the axis 120. In other embodiments, the passage 192 may be a volute passage in which the cross-sectional area gradually changes as it extends about the axis 120. The passage 192 may extend helically about the axis 120 in some embodiments as well.

Also, as shown in FIG. 1, the bearing air line outlet 196 may be disposed radially outward from the passage 192 with respect to the axis 120. A flow of cooling air may flow to the air bearing 121 and may outlet via the bearing air line outlet 196 directly to the turbine outlet passage 194. The downstream end 147 of the outlet 196 may be directed axially with the lip 158 extending axially in the downstream direction. Thus, airflow from the outlet 196 that merges with the turbine outlet passage 194 is unlikely to affect aerodynamic performance of the turbine section 113. Furthermore, if there is moisture, water, droplets, etc. in the exhaust flow through the turbine outlet passage 194 (e.g., at low velocity exhaust flow conditions), the lip 158 may act as a barrier to the intrusion of water, moisture, etc. into the bearing air line outlet 196.

Furthermore, the outer turbine housing 195, the inner turbine housing structure 197, and the turbine wheel 131 may cooperatively define a turbine wheel upstream area 174 (FIG. 3). The turbine wheel upstream area 174 may be defined radially between the nozzle structure 199 and an upstream portion 129 of the turbine wheel 131 (e.g., the leading edges of blades of the wheel 131). The turbine wheel upstream area 174 may be defined axially between the axial end 166 of the outer turbine housing 195 and the upstream portion 129 of the turbine wheel 131.

It will be appreciated that the nozzle structure 199 is an optional feature of the present disclosure. Thus, in these embodiments, the outer radial portion of the turbine wheel upstream area 174 may be open to the circumferential inlet passage 192 (i.e., unobstructed by the nozzle structure or other similar structure).

As shown in FIG. 1, the circumferential inlet passage 192 may be fluidly connected to the fuel cell stack 104 to receive the exhaust gas stream 132 therefrom. The turbine section 113 may define a first flow path (represented by arrow 180 in FIG. 1) for the exhaust gas stream 132. Specifically, fluid in the first flow path 180 may flow in a downstream direction from the inlet passage 192, through the nozzle apertures 176, into the turbine wheel upstream area 174, past the turbine wheel 131 and shroud surface 189, and into the outlet passage 194 to flow out of the turbomachine 101. This fluid flow may drive the turbine wheel 131 in rotation to provide mechanical power to the rotating group 118.

Overall, during operation of the turbomachine 101, an inlet airstream (represented by arrows 122 in FIG. 1) may flow into the inlet 153 of the compressor section 110, and the inlet airstream 122 may be compressed as it flows downstream between the compressor wheel 130 and the shroud surface 141 and further downstream into the volute passage 154. The compressed airstream 124 may exit the volute passage 154 and may be directed to the intercooler 128 and then to the fuel cell stack 104 for boosting the operating efficiency of the fuel cell system 100. Furthermore, as mentioned, the exhaust gas stream 132 from the fuel cell stack 104 may be directed back toward the turbomachine 101 and received by the passage 192 of the turbine section 113. A high-pressure exhaust gas stream 132 may be directed generally toward the turbine wheel 131 to drive rotation of the turbine wheel 131, and a low-pressure exhaust stream may exit via the outlet passage 194. Mechanical power from the turbine section 113 may be converted to electrical power for the motor 134 for ultimately assisting in rotation of the compressor wheel 130.

As shown, for example, in FIG. 3, the turbine section 113 may further include a recirculation flow path 182. The recirculation flow path 182 may extend from the circumferential inlet passage 192, through turbine wheel upstream area 174, and back to the circumferential inlet passage 192. Accordingly, fluid (e.g., liquid water that is airborne within the exhaust gas stream 132) may circulate through the flow path 182 without affecting rotation of the turbine wheel 131 as will be discussed.

The recirculation flow path 182 may be partly defined by one or more recirculation channels 184, which fluidly connect the turbine wheel upstream area 174 with the circumferential inlet passage 192. In some embodiments represented by FIGS. 2 and 3, the recirculation channel 184 may be defined at least partly by a radial gap between the outer radial surface 170 and the inner radial surface 172. Furthermore, in some embodiments, the recirculation channel 184 may be defined by one or more axial apertures 486 extending axially through the outer turbine housing 195. The axial apertures 486 are shown in phantom in FIG. 2 and will be discussed in greater detail below with reference to FIG. 6. It will be appreciated that the recirculation channel 184 may have other configurations without departing from the scope of the present disclosure. Furthermore, it will be appreciated that the recirculation channel 184 may include a combination of features (e.g., both the radial gap between the surfaces 170, 172 and the axial apertures 486) without departing from the scope of the present disclosure.

As stated, in the embodiment of FIG. 3, the recirculation channel 184 may be defined by the radial gap between the outer and inner radial surfaces 170, 172. This gap may extend continuously and annularly about the axis 120. Also, in some embodiments, at least one of the outer radial surface 170 and the inner radial surface 172 may include a recess that extends arcuately about the axis 120. For example, at least one of the surfaces 170, 172 may include an arcuate groove 168. In the illustrated embodiment, for example, the outer radial surface 170 includes the groove 168. The arcuate groove 168 may have a rectangular cross section as shown in FIG. 3 and may have a groove depth 167 (measured radially) and a groove width 165 (measured axially). The groove 168 may also be centered axially on the outer radial surface 170.

Thus, the exhaust gas stream 132 may include a combination of gas (air) and liquid (water), which is received within the circumferential inlet passage 192. This fluid combination may flow through the nozzle apertures 176 to be received within the turbine wheel upstream area 174. Pressure build-up within the turbine wheel upstream area 174 may cause the gaseous portion of the combination (the air) to continue along the first flow path 180 to the outlet passage 194 and may cause the liquid portion (the water) to move into the recirculation channel 184 along the recirculation flow path 182, thereby returning to the circumferential inlet passage 192.

The recirculation flow path 182 may increase the water ingestion capability of the turbomachine 101. Liquid recirculation provided by the flow path 182 may reduce the effect of the liquid on the rotation of the turbine wheel 131. For example, at least some liquid entering the turbine wheel upstream area 174 may recirculate one or more times within the recirculation flow path 182 instead of flowing directly past the turbine wheel 131. Stated differently, the recirculation flow path 182 may reduce the instantaneous liquid flow rate along the first flow path 180. As such, liquid in the first flow path 180 is less likely to apply a braking force to the turbine wheel 131 for reducing rotational speed, thereby providing high efficiency operation of the turbomachine 101. Also, surging rotation of the turbine wheel 131 is less likely because the load of the liquid on the wheel 131 may be reduced, may be more balanced, etc. Furthermore, loads on the bearing 121 may be reduced and the operating life of the turbomachine 101 may be extended.

Figure 4:
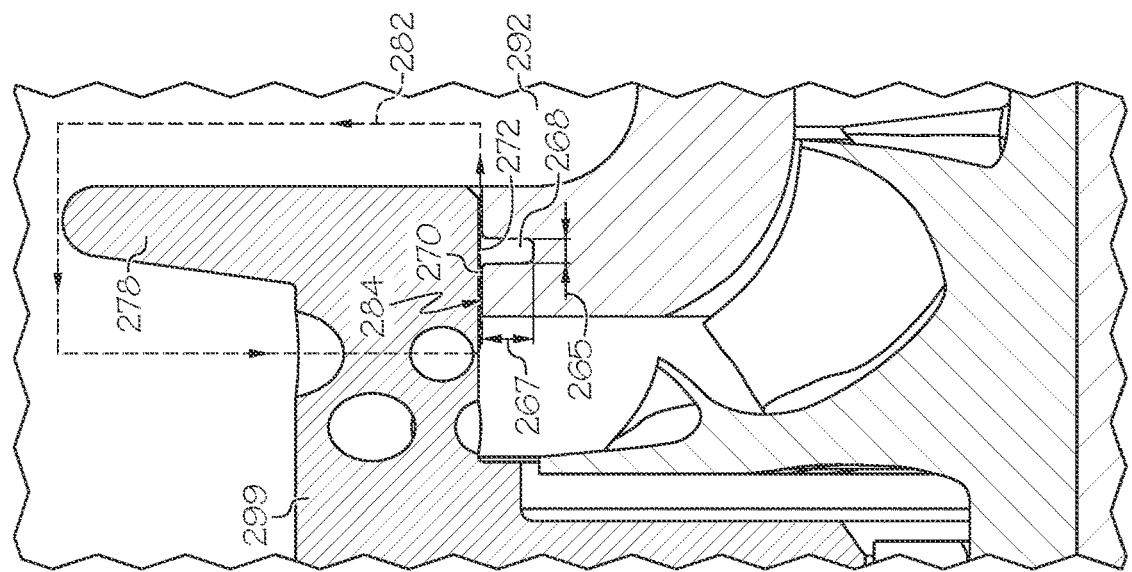
FIG. 4 is a cross-sectional view of the turbine section of FIG. 2 according to example embodiments.

FIG. 4 illustrates another embodiment and may be substantially similar to the embodiment of FIG. 3 except as noted. Components that correspond to those of FIG. 3 are indicated with corresponding reference numbers increased by 100. As shown, the channel 284 of the recirculation flow path 282 may be defined by the unsealed radial gap between the outer radial surface 270 and the inner radial surface 272. The groove 268 may be rectangular in cross-sectional shape, similar to the embodiment of FIG. 3, but the depth 267 of the groove 268 may be greater than that of FIG. 3, and the width 265 of the groove 268 may be smaller than that of FIG. 3. In addition, the dam 278 of the nozzle structure 299 may be larger than that of FIG. 3 such that the dam 278 projects radially outward to a greater dimension.

Figure 5:
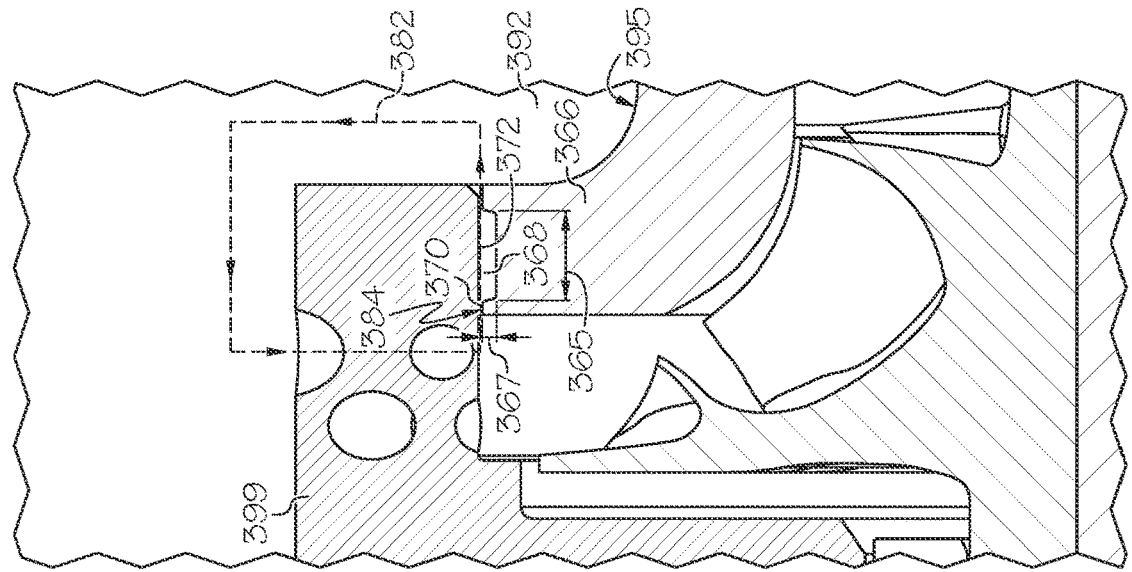
FIG. 5 is a cross-sectional view of the turbine section of FIG. 2 according to example embodiments.

FIG. 5 illustrates an additional embodiment, wherein components that correspond to those of FIG. 3 are indicated with corresponding reference numbers increased by 200. As shown, the channel 384 of the recirculation flow path 382 may be defined by the unsealed radial gap between the outer radial surface 370 and the inner radial surface 372. The groove 368 may be rectangular in cross-sectional shape, similar to the embodiment of FIG. 3, except that the depth 367 of the groove 368 may be less than that of FIG. 3, and the width 365 of the groove 368 may be greater than that of FIG. 3. Furthermore, as shown in FIG. 5, the nozzle structure 399 may be "dam-less" such that the nozzle structure 399 projects at a substantially constant diameter until it terminates proximate the axial end 366 of the outer turbine housing 395.

It will be appreciated that the dimensions (e.g., the depth and/or width) of the groove 168, 268, 368 may be predetermined, selected, and configured such that the recirculation channel 184, 284, 384 provides desired flow characteristics for the liquid to recirculate. Moreover, the size of the dam 178, 278 may be selected for providing desired flow characteristics from the inlet passage 192, 292, 392 toward the nozzle structure 199, 299, 399, or the dam can be omitted as represented in FIG. 5 to provide desired flow characteristics. It will also be appreciated that other dimensions and features of the channel 184, 284, 384 may be selected for providing the desired flow characteristics.

Figure 6:
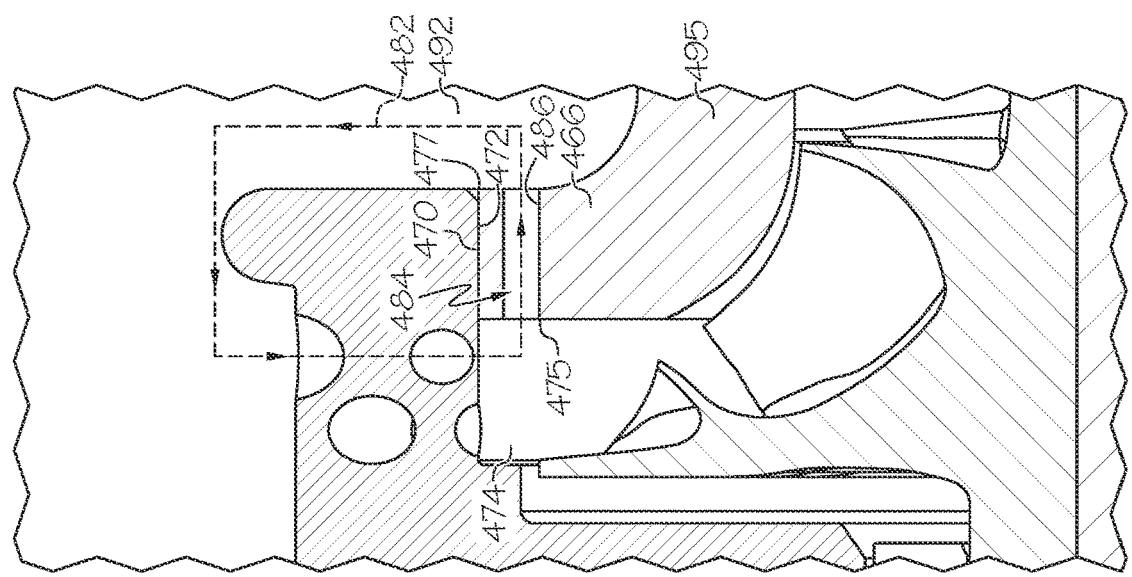
FIG. 6 is a cross-sectional view of the turbine section of FIG. 2 according to example embodiments.

Referring now to FIGS. 2 and 6, additional embodiments will be discussed. Components that correspond to those of FIG. 3 are indicated with corresponding reference numbers increased by 300. As shown, the channel 484 of the recirculation flow path 482 may be collectively defined by a plurality of axial apertures 486. At least one aperture 486 may be a circular through-hole that is axially straight and that extends through the axial end 466 of the outer turbine housing 495. At least one aperture 486 may extend substantially parallel to the longitudinal axis and may have a substantially constant width (diameter). There may be any number of axial apertures 486 (e.g., six in total), and the apertures 486 may be spaced approximately equally in the circumferential direction as shown in FIG. 2. In some embodiments, an upstream end 475 of the aperture 486 may be disposed upstream of the shroud surface 489 and upstream of the turbine wheel 431 and may be open to the turbine wheel upstream area 474. A downstream end 477 of the aperture 486 may be aligned axially with the upstream end 475 and may be open to the circumferential inlet passage 492. In some embodiments, the outer radial surface 470 and the inner radial surface 472 may be smooth and groove-less instead of including the annular grooves discussed above and shown in FIGS. 4 and 5. As such, the apertures 486 may primarily define the recirculation flow channel 484; however, in other embodiments, the apertures 486 and the gap between the radial surfaces 470, 472 may collectively define the recirculation flow channel 484.

In summary, the turbomachine 101 of the present disclosure may include a number of configurations of the recirculation flow path 182, 282, 382, 482. The flow path 182, 282, 382, 482 increases the capability of the turbomachine 101 to ingest water or other fluids. Additionally, the bearing cooling path may outlet to the turbine exhaust flow path and may be directed axially in the downstream direction. Accordingly, the bearing cooling path may be incorporated without negatively affecting aerodynamic performance of the turbine section. Furthermore, the axially-directed outlet of the bearing air line outlet may provide protection from water intrusion in an upstream direction into the bearing cooling path.

The turbomachine 101 can also be manufactured efficiently. In particular, the housing 119 at the turbine section 113 can be attached together with relatively few steps and may have a relatively low part count. In some embodiments of manufacture, the back plate 198 of the inner turbine housing structure 197 may be layered on the motor housing 150 with one or more seals therebetween. The turbine wheel 131 may also be disposed within the nozzle structure 199. Then, the outer turbine housing 195 may be attached to the back plate 198 and/or the motor housing 150 with one or more fasteners with the end 166 received within the nozzle structure 199. As such, the features of the turbine stage 113, including the recirculation flow path 182, 282, 382, 482 may be provided. Furthermore, the turbine housing 195 may be manufactured efficiently to include the bearing cooling path outlet 196.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbomachine comprising:
   a rotating group with a turbine wheel;
   a housing that houses the rotating group, the housing defining a turbine outlet passage for exhaust from the turbine wheel, the turbine outlet passage directed in a downstream direction along an axis of the turbine outlet passage; and
   an air bearing system with at least one bearing component that supports the rotating group for rotation relative to the housing, the air bearing system including a bearing cooling path that is fluidly connected to the at least one bearing component and that has a bearing air line outlet, the bearing air line outlet terminating at a terminal end that is disposed at and fluidly connected to the turbine outlet passage, the terminal end directed in the downstream direction along the axis.

2. The turbomachine of claim 1, wherein the housing includes a turbine housing that covers over the turbine wheel, the turbine housing including the turbine outlet passage, the turbine housing including the bearing air line outlet.

3. The turbomachine of claim 2, wherein the turbine housing at least partly defines a circumferential flow passage disposed upstream of the turbine wheel; and
   wherein the bearing air line outlet is disposed radially outward from the circumferential flow passage with respect to the axis.

4. The turbomachine of claim 3,
   wherein the bearing airline outlet includes a radially-extending section that is disposed upstream of the terminal end.

5. The turbomachine of claim 3, wherein the turbine housing includes a lip that radially separates the bearing air line outlet from the turbine outlet passage.

6. The turbomachine of claim 5, wherein the turbine housing includes a first turbine exhaust pipe and a second turbine exhaust pipe that are arranged in series along the axis and that cooperatively define the turbine outlet passage;
   wherein the second turbine exhaust pipe is disposed downstream of the first turbine exhaust pipe and has a larger width than the first turbine exhaust pipe; and
   wherein the lip is defined at a transition between the first exhaust pipe and the second exhaust pipe.

7. The turbomachine of claim 3, wherein the turbine housing includes an outer turbine housing and an inner turbine housing that cooperatively house the turbine wheel and that cooperatively define the circumferential flow passage, the outer turbine housing covering over a front face of the turbine wheel, and the inner turbine housing covering over a back face of the turbine wheel; and
   wherein the outer turbine housing includes the turbine outlet passage and the bearing air line outlet.

8. The turbomachine of claim 7, wherein the outer turbine housing is unitary.

9. The turbomachine of claim 7, wherein the inner turbine housing includes a nozzle structure that extends about the turbine wheel, the nozzle structure including at least one nozzle aperture directed toward the turbine wheel.

10. The turbomachine of claim 9, wherein the turbine housing includes a recirculation flow path that extends from the circumferential flow passage, through the nozzle structure, and back to the circumferential flow passage.

11. The turbomachine of claim 1, further comprising an electric motor that is operatively connected to the rotating group for driving the rotating group in rotation within the housing.

12. The turbomachine of claim 1, wherein the turbine wheel is configured to receive an exhaust flow from a fuel cell stack.

13. A turbomachine comprising:
    a rotating group with a turbine wheel;
    a housing that houses the rotating group, the housing defining a turbine outlet passage for exhaust from the turbine wheel, the turbine outlet passage directed in a downstream direction along an axis of the turbine outlet passage; and an air bearing system with at least one bearing component that supports the rotating group for rotation relative to the housing, the air bearing system including a bearing cooling path that is fluidly connected to the at least one bearing component and that has a bearing air line outlet, the bearing air line outlet terminating at a terminal end that is disposed at and fluidly connected to the turbine outlet passage and directed in the downstream direction along the axis; and the housing including a turbine housing that covers over the turbine wheel, the turbine housing including the turbine outlet passage, the turbine housing including the bearing air line outlet, the turbine housing at least partly defining a circumferential flow passage disposed upstream of the turbine wheel, the bearing air line outlet being disposed radially outward from the circumferential flow passage with respect to the axis, the turbine housing including a lip that radially separates the bearing air line outlet from the turbine outlet passage.

14. The turbomachine of claim 13, wherein the turbine housing includes a first turbine exhaust pipe and a second turbine exhaust pipe that are arranged in series along the axis and that cooperatively define the turbine outlet passage;

wherein the second turbine exhaust pipe is disposed downstream of the first turbine exhaust pipe and has a larger width than the first turbine exhaust pipe; and wherein the lip is defined at a transition between the first exhaust pipe and the second exhaust pipe.

15. The turbomachine of claim 13, wherein the turbine housing includes an outer turbine housing and an inner turbine housing that cooperatively house the turbine wheel and that cooperatively define the circumferential flow passage, the outer turbine housing covering over a front face of the turbine wheel, and the inner turbine housing covering over a back face of the turbine wheel; and wherein the outer turbine housing includes the turbine outlet passage and the bearing air line outlet.

16. The turbomachine of claim 15, wherein the outer turbine housing is unitary.

17. A turbomachine comprising:

a rotating group with a turbine wheel;

a housing that houses the rotating group, the housing defining a turbine outlet passage for exhaust from the turbine wheel, the turbine outlet passage directed in a downstream direction along an axis of the turbine outlet passage; and an air bearing system with at least one bearing component that supports the rotating group for rotation relative to the housing, the air bearing system including a bearing cooling path that is fluidly connected to the at least one bearing component and that has a bearing air line outlet, the bearing air line outlet fluidly connected to the turbine outlet passage and directed in the downstream direction along the axis;

the housing including a turbine housing that covers over the turbine wheel, the turbine housing including the turbine outlet passage, the turbine housing including the bearing air line outlet, the turbine housing at least partly defining a circumferential flow passage disposed upstream of the turbine wheel, the bearing air line outlet being disposed radially outward from the circumferential flow passage with respect to the axis, the bearing air line outlet including a terminal end at the turbine outlet passage, the terminal end being directed in the downstream direction along the axis, and the bearing airline outlet including a radially-extending section that is disposed upstream of the terminal end.

18. The turbomachine of claim 17, further comprising an electric motor that is operatively connected to the rotating group for driving the rotating group in rotation within the housing.

19. The turbomachine of claim 17, wherein the turbine housing includes an outer turbine housing and an inner turbine housing that cooperatively house the turbine wheel and that cooperatively define the circumferential flow passage, the outer turbine housing covering over a front face of the turbine wheel, and the inner turbine housing covering over a back face of the turbine wheel; and wherein the outer turbine housing includes the turbine outlet passage and the bearing air line outlet.

20. The turbomachine of claim 19, wherein the outer turbine housing is unitary.

* * * * *